United States Patent
Ford et al.

(10) Patent No.: US 6,907,979 B2
(45) Date of Patent: Jun. 21, 2005

(54) METHOD AND APPARATUS FOR GROUPING ASEPTIC PRODUCTS

(75) Inventors: Colin Ford, Woodstock, GA (US); David Warner, Kennesaw, GA (US); Cory Hawley, Austell, GA (US)

(73) Assignee: Graphic Packaging International, Inc., Marietta, GA (US)

( * ) Notice: Subject to any disclaimer, the term of this patent is extended or adjusted under 35 U.S.C. 154(b) by 0 days.

(21) Appl. No.: 10/245,907

(22) Filed: Sep. 17, 2002

(65) Prior Publication Data

US 2004/0050663 A1 Mar. 18, 2004

(51) Int. Cl.⁷ .............................................. B65G 47/26
(52) U.S. Cl. ........................ 198/419.3; 198/440; 53/443; 53/543
(58) Field of Search ............................ 198/440, 419.3; 53/443, 543

(56) References Cited

U.S. PATENT DOCUMENTS 3,469,673 A * 9/1969 Gentry ..................... 198/440
4,577,745 A * 3/1986 Calvert et al. ............. 198/440

* cited by examiner

*Primary Examiner*—Joseph E. Valenza
(74) *Attorney, Agent, or Firm*—Womble Carlyle Sandridge & Rice, PLLC

(57) ABSTRACT

A system and method for grouping products for packaging, including a metering station in which a line of products is engaged by a series of metering lugs. The metering lugs urge the products into off-set positions to form multiple lanes of products. Selected ones of the products are then engaged by a series of selector lugs at a selector station to urge the products together to form product groups for packaging.

27 Claims, 9 Drawing Sheets

METHOD AND APPARATUS FOR GROUPING ASEPTIC PRODUCTS

FIELD OF THE INVENTION

The present invention generally relates to product packaging systems, and in particular to a method and system for metering, selecting, and grouping aseptic products for packaging by an automated packaging machine.

BACKGROUND OF THE INVENTION

In recent years, so-called "aseptic bricks" or packages have become a popular alternative to conventional beverage packaging such as bottles and cans. Such aseptic brick packages typically include juice boxes or pouches in which a foil or paperboard tube or sleeve is filled with a liquid beverage or other bulk material and its ends sealed to form a light-weight, disposable container. Typically, these aseptic bricks or containers are packaged in groups such as four packs, six packs, eight packs, ten packs, etc., in which the bricks are placed side by side in rows of two to four bricks and are shrink wrapped or otherwise banded together for sale. The packaging of aseptic bricks in groups is, however, subject to significant problems, given the generally square or rectangular configuration of the aseptic bricks and the use of paperboard or other similar materials therefor which are compressible, as opposed to more rigid cans and bottles, and which generally are coated with a wax sealing material. As a result, as the aseptic bricks are conveyed to a conventional product packaging systems, they tend to become tightly compacted or compressed together in an end-to-end abutting arrangement. Since their sides or ends are generally flat, there typically are little or no gaps between the aseptic bricks where conventional selectors, such as star wheels and the like, can engage and separate or segregate the products into groups or sets for packaging, as is the case with bottles or cans.

One conventional method of grouping such aseptic bricks for packaging has been to cycle the aseptic bricks forwardly in a line to an end-point, whereupon a pusher will engage and push a series or group of bricks, i.e., three, four or five bricks, onto a packaging line. The line of aseptic bricks is then cycled forwardly again and a next grouping of bricks is engaged and pushed onto the packaging line to form a six, eight or ten pack. Other packaging systems have involved the use of feed screws to engage and create gaps between the aseptic bricks and urge groups or sets of bricks in series into an input position for a packaging machine line. However, the wax coating typically applied to most aseptic brick packages tends to create drag as the aseptic bricks are pushed along by the screw threads, which generally afford only limited, point-to-point contact, and can therefore lead to product misfeeds and jamming of the packaging line. In addition, most conventional aseptic brick packaging systems generally are run at significantly lower speeds than the filler equipment for the aseptic bricks, which consequently must be run at a slower rate so as to reduce the amount of product backflow and prevent jamming of the flow of products into the aseptic brick packaging machines. As a result, there typically must be at least one dedicated brick-packaging machine for each aseptic brick filling system or station.

In addition, the size and waxy surfaces of some types of aseptic bricks can lead to problems with control of the bricks, especially when there is a change in velocity of the movement of the aseptic bricks, such as when a line is stopped and restarted, or as the speed of the bricks is increased so as to try to create gaps or spaces between the bricks to enable engagement by selector devices. This can result in tipping of especially tall bricks, which problem is further compounded by the drag exerted by the waxy surfaces of the bricks and a limited engagement of the bricks by most conventional selector mechanisms.

Accordingly, it can be seen that a need exists for a method and system for metering and selecting aseptic bricks for segregation of the bricks into product groups for introduction into a product packaging machine that enables the packaging of such aseptic bricks at increased rates and which addresses these and other related problems in the art.

SUMMARY OF THE INVENTION

Briefly described, the present invention relates to a product grouping and method system for metering, selecting and forming groups of products such as "aseptic bricks" for introduction of the groups into a product packaging machine to form four packs, six packs, eight packs, ten packs and/or other varying product package configurations. Typically, the products will be received from an upstream filler assembly along an input section of a product conveyor with the products being moved along a path of travel substantially in end-to-end abutment with one another. As the products enter the product grouping system of the present invention, they pass through a metering station wherein the line of products is engaged from opposite sides by a pair of metering units.

Each of the metering units generally includes a metering lug conveyor that extends substantially parallel to the path of travel of the products and includes a series of spaced metering lugs. Each metering lug generally has a forward, proximal engaging portion and a rearward, distal section or portion attached to its lug conveyor. The metering units each further include a pair of cam plates having a cam track defined therein. First and second cam followers attached to each of the metering lugs engage and ride along the cam tracks of the cam plates so that the metering lugs of each metering unit are moved into engagement with alternating ones of the line of products moving along the product conveyor. The metering lugs typically urge the products into offset positions that are offset from a centerline of the line of products by an amount slightly greater than one-half a brick or product width, such that the products are divided into at least two separate lanes for continued movement along the product conveyor.

As the products are divided into multiple lanes across the product conveyor, they move into a selector station wherein the products are collected into sets or groups for discharge to the in-feed line of a product packaging station or machine. The selector station generally includes a pair of opposed selector units mounted along one of the multiple lanes of the product conveyor. Each of the selector units generally includes a lug conveyor having a series of spaced selector lugs. The selector lugs of each selector unit are mounted along their respective lug conveyors at different pitches. The selector lugs of a first one of the selector units also are moved at a first rate or speed, while the selector lugs of the second selector unit are moved at a second speed or rate that is different from the rate of the selector lugs of the first selector unit.

As the products are moved along their separate lanes through the selector station, selected ones of the products of each lane are engaged by the selector lugs of the opposed selector units, which urge the products forwardly along their path of travel at the first and second rates. These rates further generally are greater than the rate at which the products are being conveyed by the product conveyor so that the products of each selected group will tend to catch up to immediately preceding products to form a group of two, three, four or more abutting products in each product lane at a transfer point at the downstream end of the product grouping system of the present invention for transfer to an in-feed conveyor for the downstream product packaging machine or system.

Various objects, features and advantages of the present invention will become apparent to those skilled in the art upon a review of the following detailed description, when taken in conjunction with the accompanying drawings.

DETAILED DESCRIPTION

Figure 1:
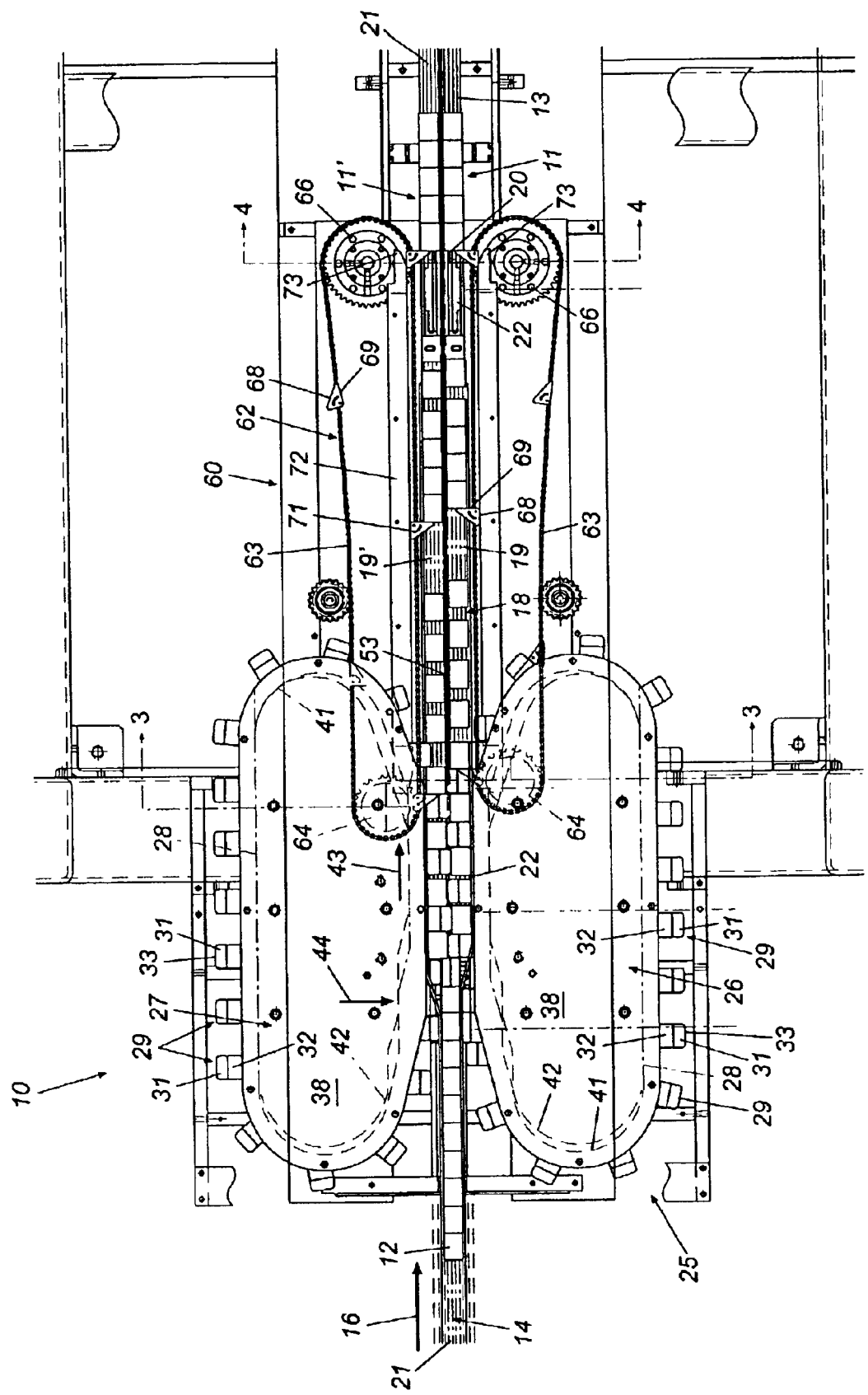
FIG. 1 is a plan view of the product grouping system of the present invention.

Referring now to the drawings in greater detail in which like numerals indicate like parts throughout the several views, FIGS. 1–6D generally illustrate the product grouping system 10 of the present invention. The product grouping system 10 (FIGS. 1 and 2) is adapted to select and form groups 11 of products 12 for introduction or transfer of the products in their selected groups 11 to an inlet or in-feed conveyor 13 of a downstream product packaging machine (not shown). The products 12 generally will be grouped into a series of 2, 3, 4, 5 or more products, typically received at the in-feed conveyor 13 of the product packaging machine in an aligned, side by side, arrangement with another group 11' (FIG. 1) of products in order to form four-packs, six-packs, eight-packs, 10-packs and/or other varying product configurations for packaging. The product grouping system of the present invention is especially suited for packaging square, rectangular or other flat sided products, such as "aseptic bricks", such as juice boxes, juice pouches, or other product containers constructed from a foil or paperboard material, which products are generally compressible. It will be understood, however, that the present invention is not limited simply to the packaging of aseptic bricks, but also can be used for grouping other types of products for packaging.

Typically, the products 12 will be received from an upstream filler assembly or system (not shown), conveyed along a product conveyor 14 with the products being moved along a path of travel indicated by arrow 16. The products generally will be received in a single line in substantially an end-to-end abutment with one another. As indicated in FIG. 1, the product conveyor 14 generally includes an upstream, input or first section 17 along which the single line of products 12 is introduced into the product grouping system 10, and a second or grouping section 18 along which the products are separated into multiple lanes of products, indicated by 19 and 19', and arranged into the selected groups of products 11 at a discharge or transfer point or end 20 for transfer to the in-feed conveyor 13 of the product packaging machine.

As indicated in FIGS. 1, 3, 4, and 6A–6D, the product conveyor 14 generally includes an Intralox belt having a series of spaced, raised ribs 21 on which the products are supported. A transfer plate or dead plate 22 is between the input and grouping sections of the product conveyor and between the discharge or transfer point 20 of the conveyor and the in-feed conveyor 13 of the product packaging machine. The products thus are able to make a smooth transition from one section of the product conveyor to the next and to the in-feed conveyor 13. Each of the sections of the product conveyor generally are driven by a variable speed drive motor to enable the speed of the products traveling along the product conveyor to be varied as needed to maintain a desired back pressure between the products being received from the filling assembly to avoid gaps or increased compression between the products.

Figure 2:
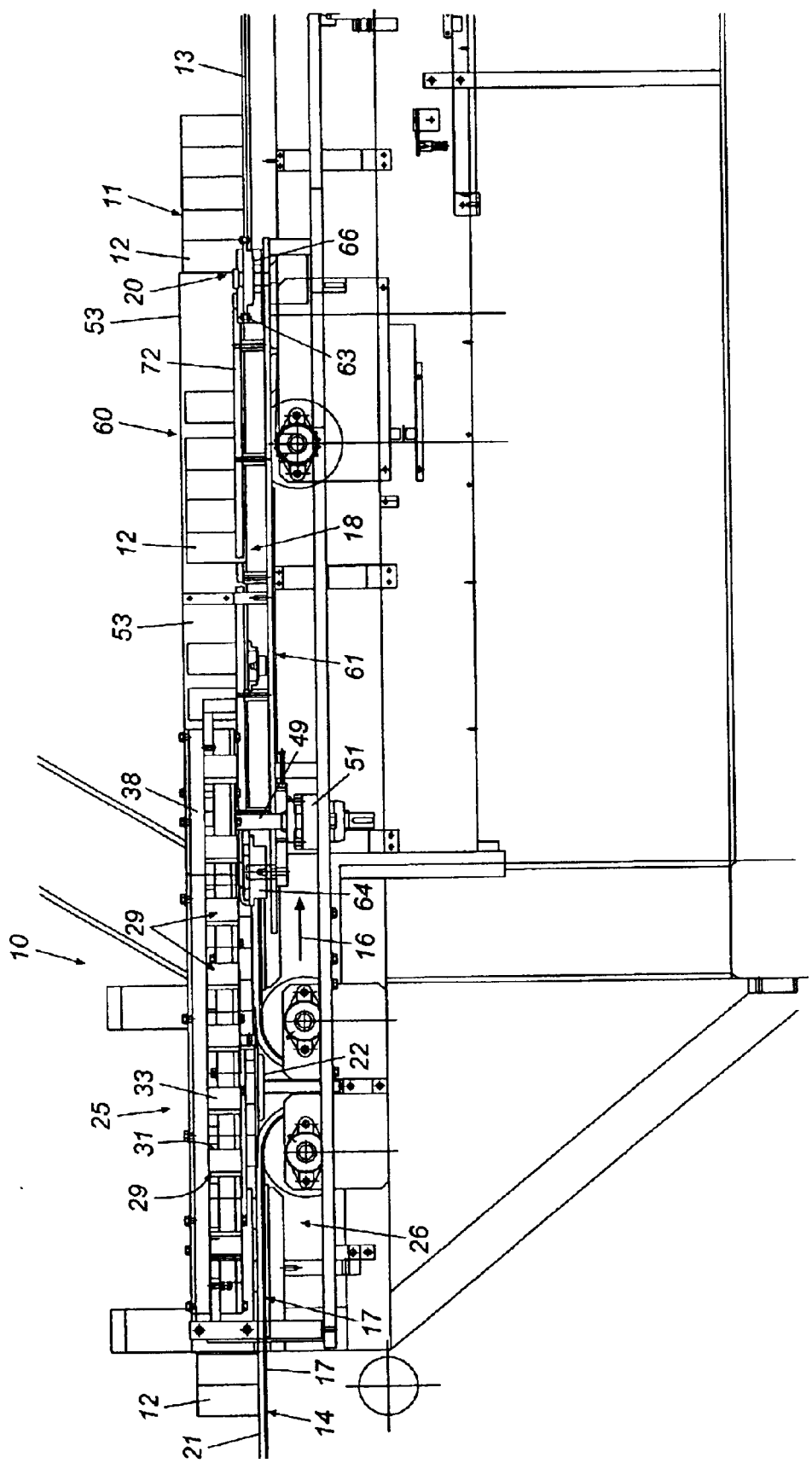
FIG. 2 is a side elevational view of the product grouping system of the present invention.

As illustrated in FIGS. 1 and 2, as the line of products 12 enters the upstream end of the product grouping system 10 along the input section 17 of the product conveyor 14, the products are passed through a metering station 25, wherein the line of products generally is engaged from opposite sides by a pair of opposed metering units 26 and 27. The metering units 26 and 27 typically engage alternating ones of the products of the line of products being fed into the product grouping system so that the products are separated into the separate lanes 19 and 19' of the product conveyor 14. As indicated in FIGS. 1, 5 and 6A, each of the metering units 26 and 27 generally includes a metering lug conveyor 28 that extends along an elliptical path substantially parallel to the line of products moving along the product conveyor.

The metering lug conveyors 28 generally include belts, chains or other, similar conveying elements and have a series of spaced metering lugs 29 mounted along the length thereof Each metering lug 29 is typically is formed from a plastic material, such as nylon, Delrin or other similar lightweight, durable, non-stick material, and includes a forward proximal engaging portion 31 and a rearward distal section or portion 32 that typically extends horizontally and is attached to its lug conveyor 28. The forward engaging portions of each of the metering lugs generally are substantially rectangular with a substantially flat front or forward face or surface 33, and typically are of a width substantially equal to or less than the width of the products 12 moving along the product conveyor. As further indicated in FIG. 5, the rearward distal portions of the metering lugs each generally have outwardly flared or laterally extending projections 34 and 36. As indicated in FIG. 6A, a connector pin or first cam follower 37 is attached to one of the projections 34 of each metering lug and connects to the lug conveyor 28 so that the metering lugs are moved or carried with the lug conveyor toward and away from engagement with the products as indicated in FIG. 6A.

Figure 3:
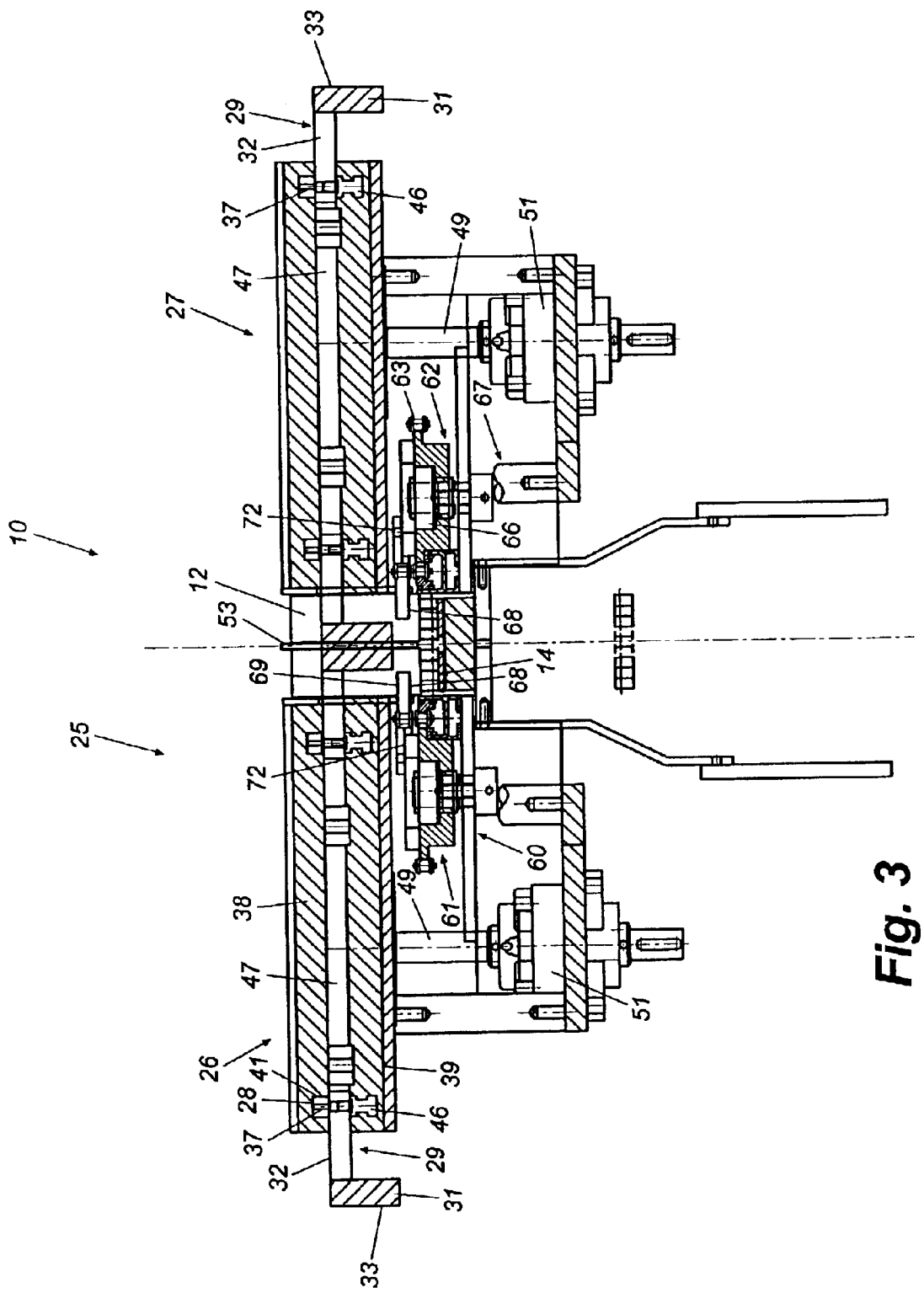
FIG. 3 is a cross-sectional view taken along lines 3—3 of FIG. 1 of the product grouping system of the present invention.
Figure 4:
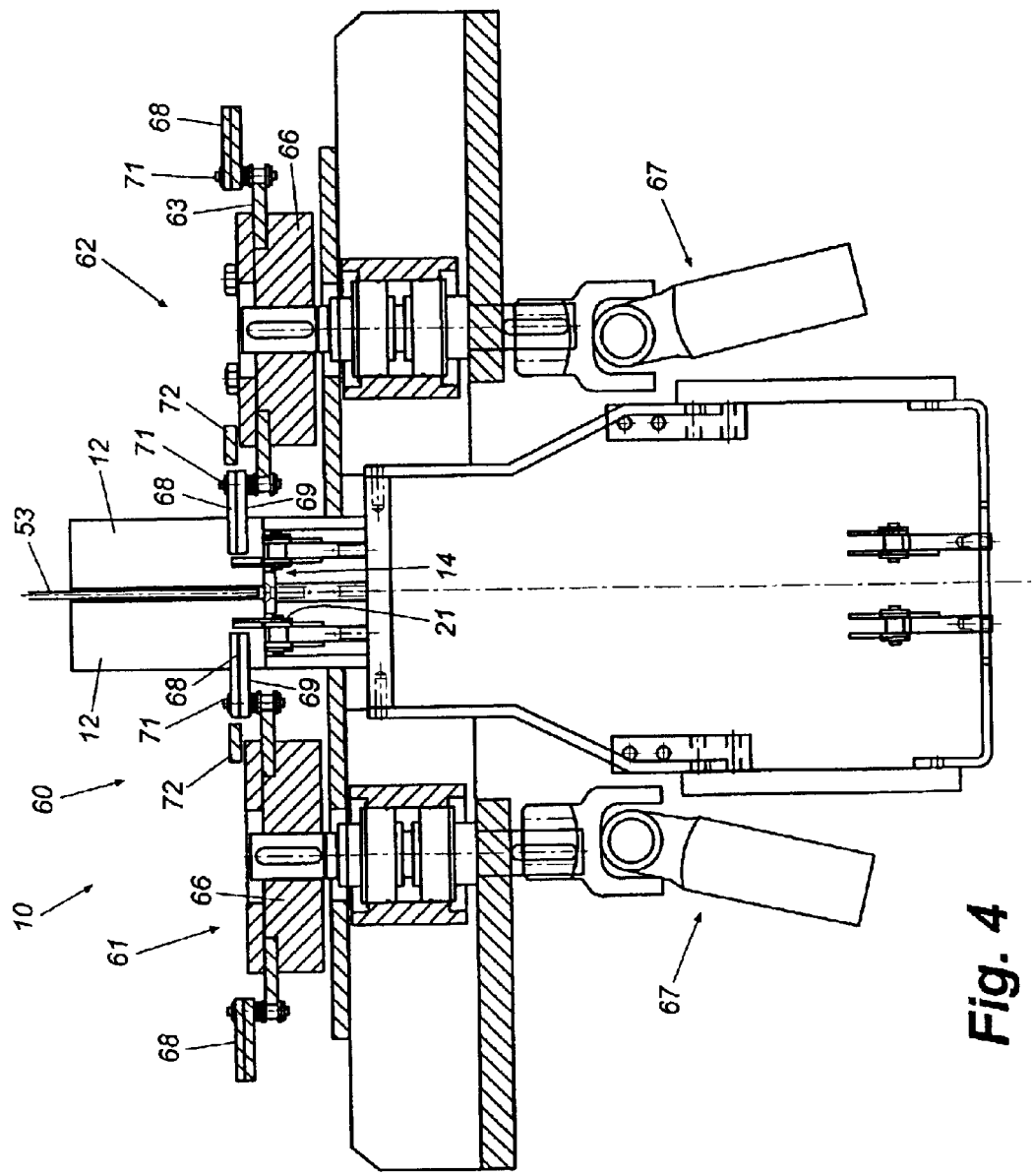
FIG. 4 is a cross-sectional view taken along lines 4—4 of FIG. 1 of the product grouping system of the present invention.
Figure 5:
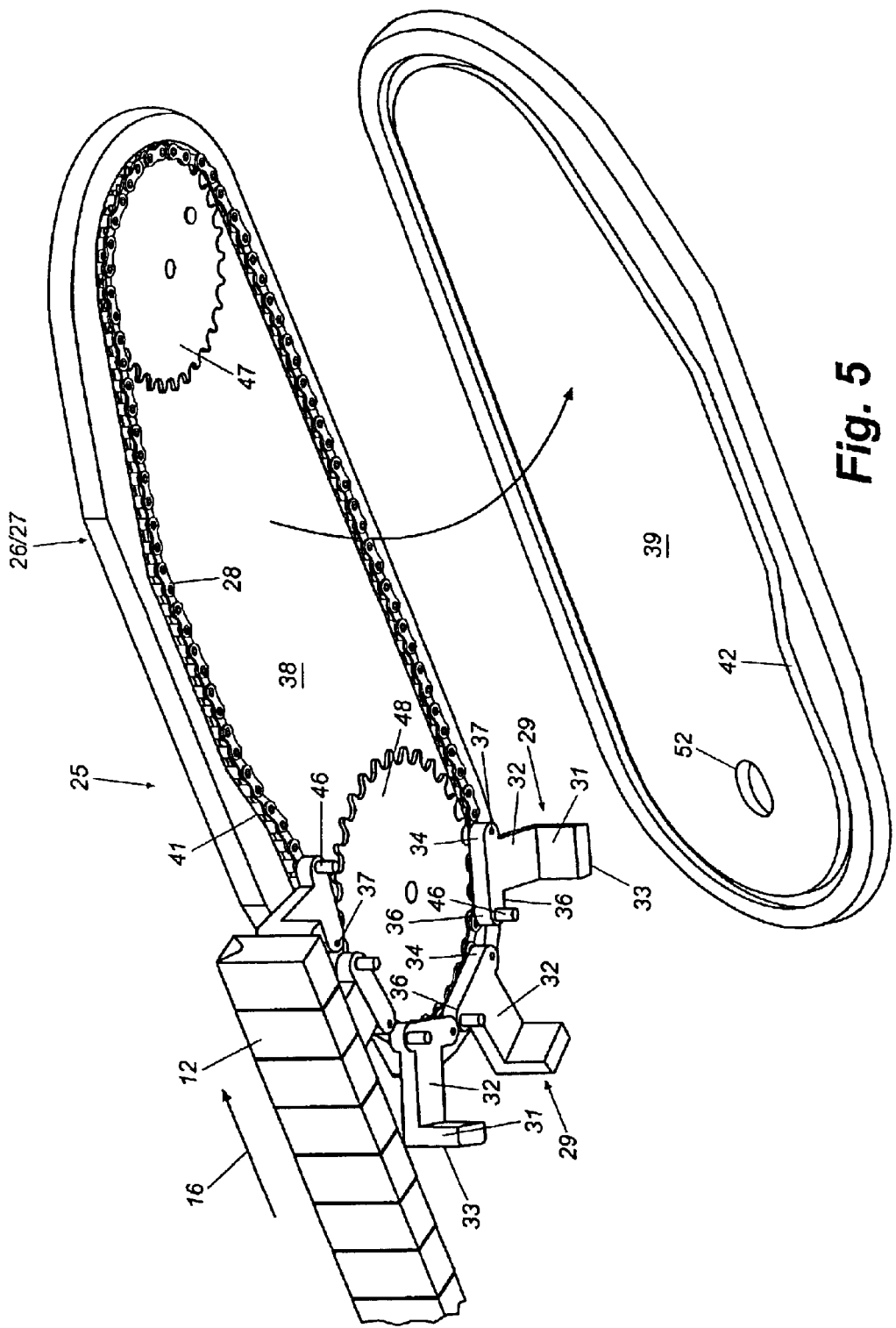
FIG. 5 is an exploded perspective view illustrating the cam tracks and movement of the metering lugs.
Figure 6A:
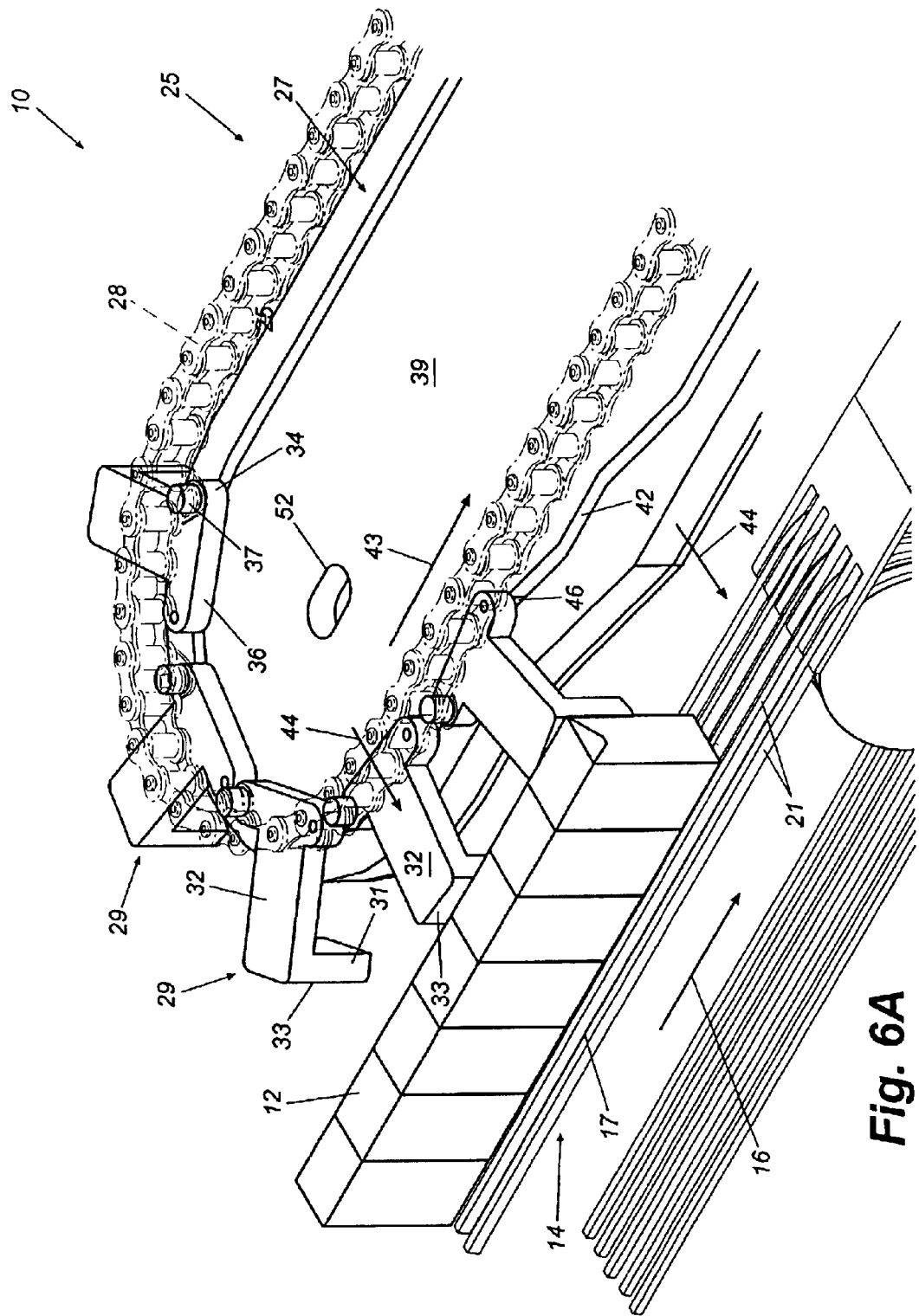
FIGS. 6A–6D are a series of perspective views illustrating the operation of the product grouping system of the present invention showing the engagement and separation of the line of products by the metering and selector units for forming selected groups of products for packaging.

As indicated in FIGS. 3 and 5, each of the metering units 26 and 27 further generally includes a pair of stacked, opposed cam plates 38 and 39. Each of the cam plates 38 and 39 generally includes a cam track or guide track 41 or 42, respectively. As illustrated in FIGS. 3 and 5, the lug conveyor 28 and first cam follower 37 of each of the metering lugs is received and moves along the upper or first cam track 41 formed in the upper cam plate 38 so as to accordingly guide the metering lugs about their path of travel into and out of engagement with the products 12, as indicated by arrows 43 and 44 in FIG. 6A. A second cam follower 46 is attached to the lower or underside portions of the second projections 36 of each of the metering lugs 29, as indicated in FIGS. 5 and 6, which second cam follower 46 is received and moves along the second cam track 42 formed in the lower cam plate 39. The movement of the second cam follower 46 along its cam track 42 causes the metering lugs to be pivoted and thus aligned substantially parallel with the side surfaces of the products 12, as indicated in FIGS. 1, 5 and 6A–6B, so that as the metering lugs are moved in the direction of arrows 43 and 44 (FIGS. 6A and 6B) the front surfaces 33 of their forward engaging portions 31 are aligned substantially parallel with the products so as to substantially fully engage the flat surfaces of the products to urge the products across the product conveyor and into one of the lanes of the product conveyor.

As indicated in FIG. 5, each lug conveyor 28 of each metering station is extended about a drive sprocket 47 and an idler sprocket 48, with the drive sprockets 47 each being connected to a drive shaft 49 (FIG. 3) that is linked to a drive motor 51. The drive motors generally drive the lug conveyors at speeds approximately equivalent to the speed or rate at which the products 12 are being moved along their path of travel 16, along the product conveyor. The metering lugs generally are spaced or pitched along their lug conveyors approximately equivalent to the movement of the products being conveyed along the product conveyor so that each of the metering lugs is product pitched, with the metering lugs of the opposed metering units engaging alternate ones of the products. As further indicated in FIG. 5, the product conveyors can be adjusted by adjusting the position of their idler sprockets 48 via an adjustment slot 52 (FIG. 5) formed in lower cam plate 39.

Figure 6B:
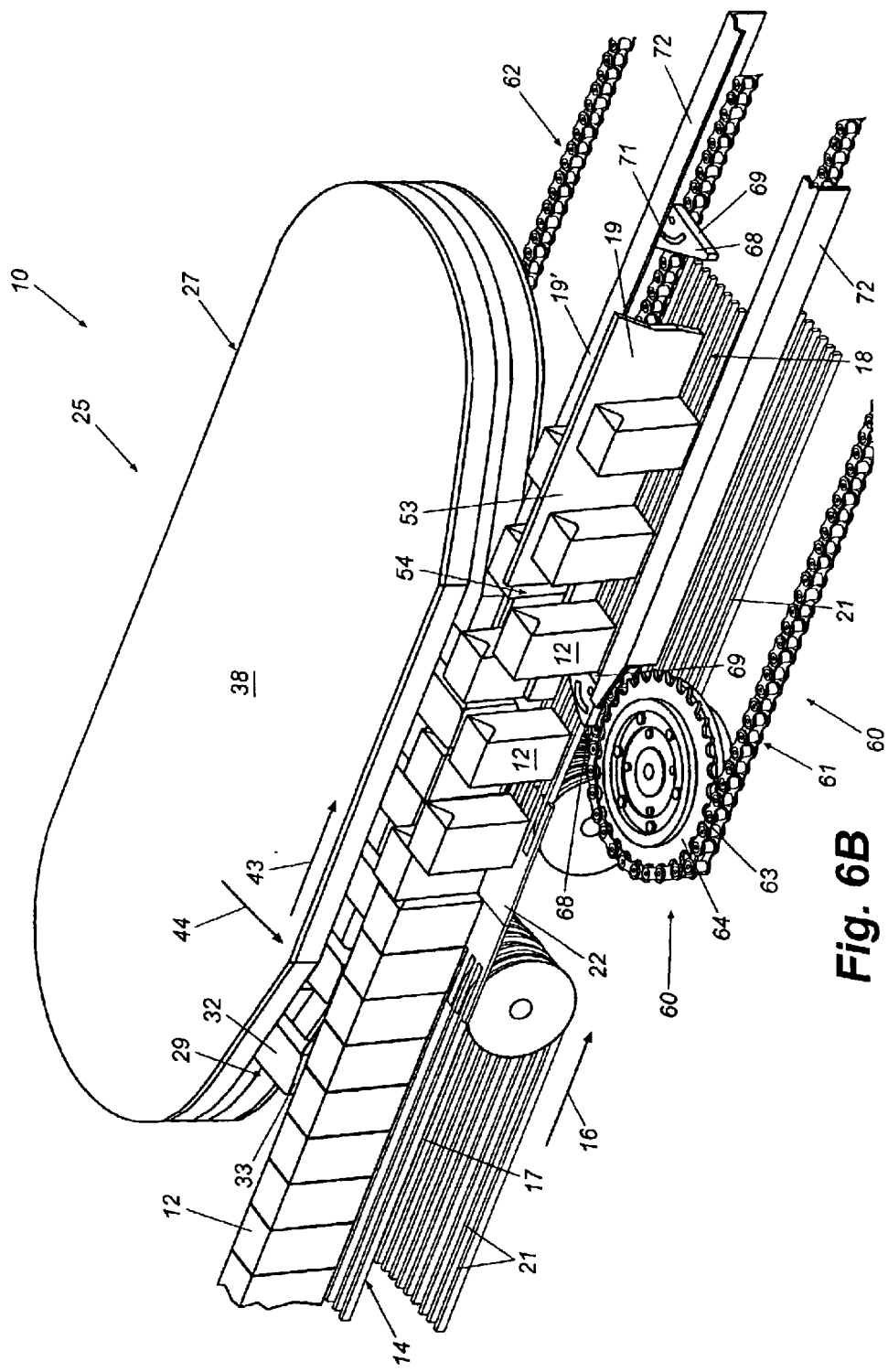
Figure 6C:
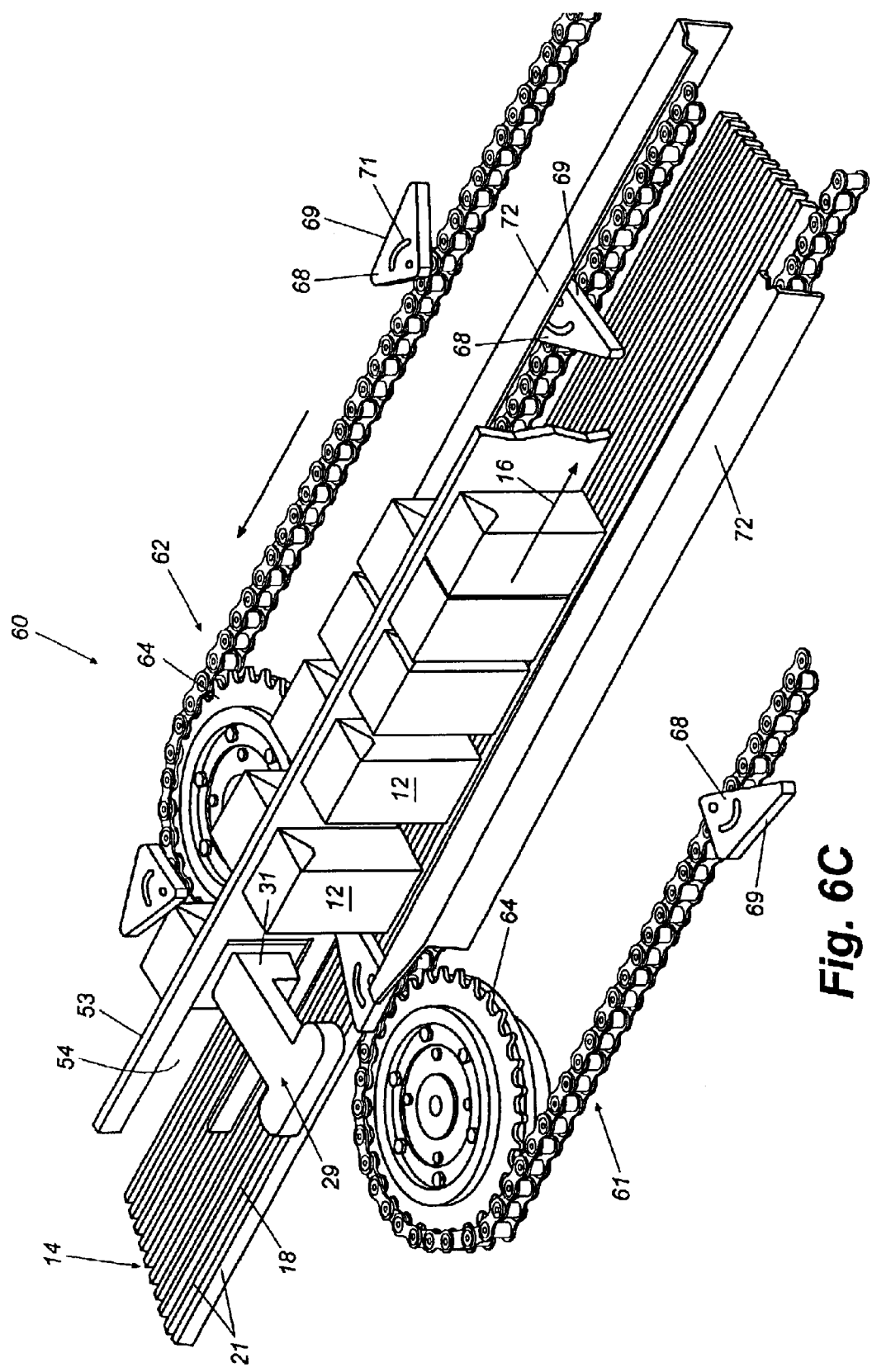

As indicated in FIGS. 1, 6A, and 6B the metering lugs of each of the metering stations generally engage alternating ones of the products 12 as the products are being transitioned from the input or in-feed section 17 of the product conveyor to the intermediate section 18. As the metering lugs engage their respective products, the metering lugs are moved in a direction normal to the products, as indicated by arrow 44, while at the same time are moved in a substantially parallel alignment with the products in the direction of arrow 43 (FIG. 6B). As a result, the products are urged laterally across the product conveyor into the different lanes 19 and 19' of the product conveyor. The products generally are shifted across the product conveyor by an amount slightly greater than the width or thickness of the products being conveyed so as to create a slight separation between the products.

As indicated in FIGS. 1–4 and 6B–6C, after the products have been metered and separated into the respective product lanes 19 and 19', a guide plate 53 is received between the lanes of products so as to maintain the products in their separate lanes. The forward or proximal end of the guide plate 53 generally is formed with a cut-out portion 54 (FIGS. 6B and 6C) which enables the metering lugs to complete their motion for urging their selected products into one of the product lanes on the product conveyor and thereafter can be pivoted out of engagement with the products as the products are moved along the guide plate so as to not interfere with the operation of the metering lugs.

A selector station 60 (FIG. 1) is positioned downstream from the metering station 25, extending along the second or grouping portion 18 of the product conveyor 14 from a position adjacent the upstream dead-plate or transfer plate 22 through the transfer or discharge point 20 between the product conveyor 14 and in-feed conveyor 13 for the product packaging machine. As indicated in FIGS. 1, 4 and 6B–6D, the selector station 60 includes a pair of opposed selector units 61 and 62 positioned on opposite sides of the product conveyor 14 along one of the lanes 19 or 19' thereof. Each selector unit 61 and 62 generally includes selector conveyor, which can be a chain, belt or similar conveyor that extends about a substantially elliptical path about an upstream idler sprocket 64 to a downstream drive sprocket 66. Each of the drive sprockets 66 is driven by a variable speed drive, indicated at 67 in FIG. 4, with the selector conveyor 63 of selector unit 62 being driven at a slightly greater rate than the selector conveyor of selector unit 61.

As indicated in FIGS. 1, 4 and 6B–6D, a series of selector lugs 68 are mounted to the lug conveyors of each of the selector units 61 and 62. The selector lugs of the selector units 61 and 62 generally are mounted at different spacings or pitches, based upon the overall rate at which the products are being packaged by the downstream packaging machine and the rate at which the products are being input into the product grouping system 10. Typically, the selector lugs 68 of the conveyor 63 of selector unit 62 will be at a greater pitch or spacing than the lug conveyor of selector unit 61, but the lug conveyor of selector unit 62 also generally will be operated at a first rate that is faster than a second rate at which the lug conveyor of selector unit 61 is operated. The rates of movement or operation of the lug conveyors of selector units 61 and 62 further are greater than the rate at which the products themselves are being moved along the lanes 19 and 19' of the product conveyor.

Figure 6D:
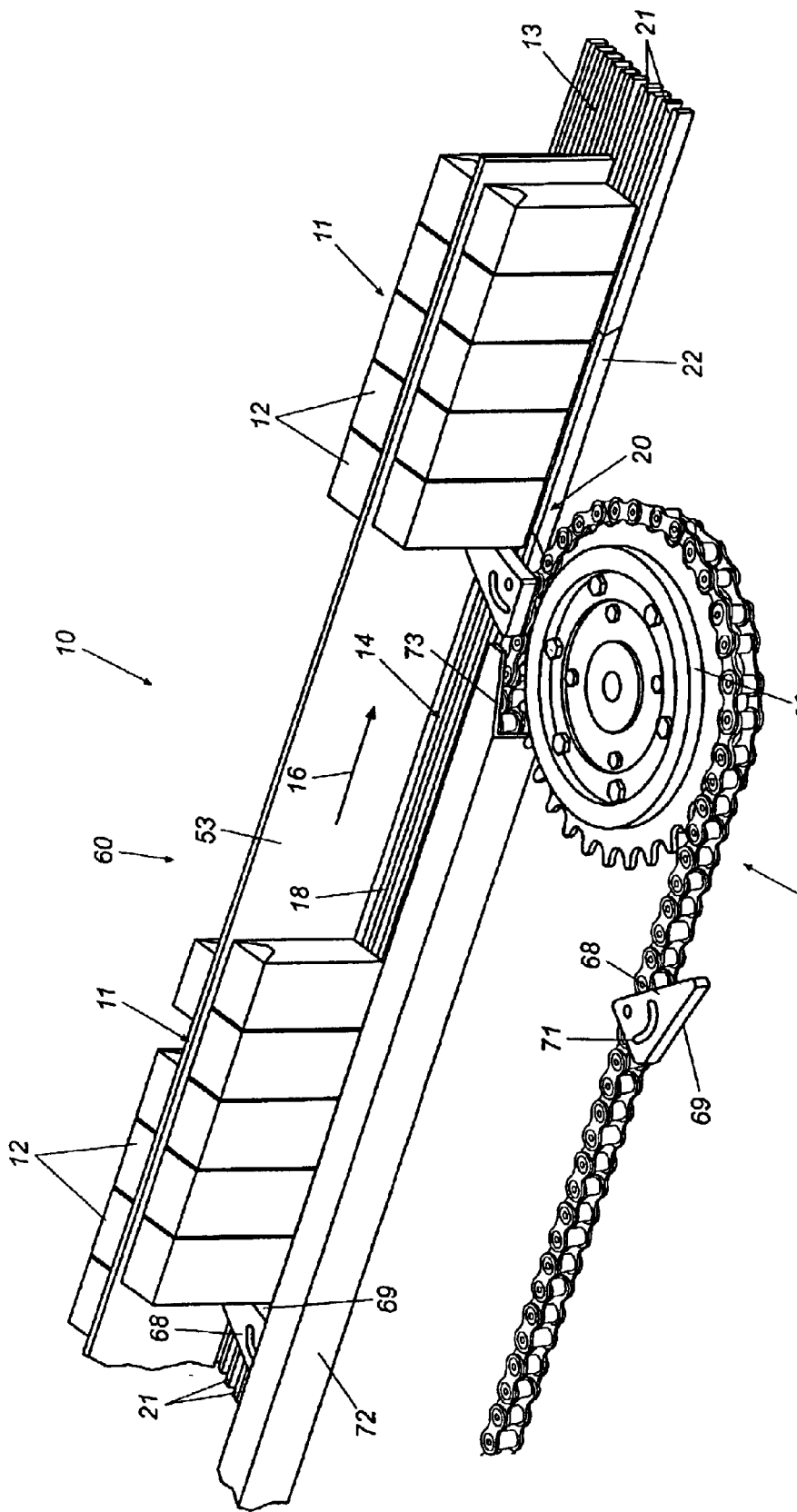

As shown in FIGS. 1, 6 and 6D, each of the selector lugs 68 generally is substantially triangularly shaped with a substantially flat, forward pushing edge 69. Each selector lug generally is pivotally attached to its lug conveyor 63 by a pivot pin 71 so that the selector lugs can be pivoted from a retracted, non-engaging position to a forwardly extending, engaging position for engaging and urging the products along the grouping section 18 of the product conveyor 14, as indicated in FIGS. 1 and 6B–6D. Guide rails 72 generally are mounted along the path of travel of each of the lug conveyor of each selector unit, positioned adjacent and extending substantially parallel to the lanes of the product conveyor 14. The selector lugs engage and ride along the guide rails as they are pivoted around the upstream idler sprockets 64, so that the selector lugs are pivoted into their forwardly extending engaging position to engage the products. At the downstream end of each selector unit, adjacent the transfer point 20 between the product conveyor 14 and in-feed conveyor 13, as indicated in FIG. 1, the guide rails are tapered or sloped toward an end point 73, such that the selector lugs are allowed to pivot toward their non-engaging positions as they are pulled further forwardly against the rear surfaces of the products.

As indicated in FIGS. 1–6B–6E, as the offset lines of products are moved along the lanes 19 and 19' of the product conveyor 14, they are engaged on the selector lugs of the selector units 61 and 62, respectively. As the products proceed along the product conveyor, the movement of the selector lugs 68 of the selector units 61 and 62 at their differing rates, which are both generally faster than the rate at which selected products are being conveyed by the product conveyor, causes the products to be urged forwardly into an end-to-end abutting relationship with the immediately preceding products to form the selected product groups, i.e., groups of two, three, four, or more products. Each of the groups 11 of products formed by the selector units 61 and 62 are received at the discharge or transfer point 20 between the product conveyor 14 and in-feed conveyor 13 of a product packaging machine, with the groups of each lane aligned in a substantially parallel arrangement to form a product package, such as a four-pack, eight-pack, ten-pack or other arrangement as indicated in FIG. 1.

As illustrated in FIGS. 1 and 6A–6D, in the operation of the product grouping system 10 of the present invention, a line of products 12 generally is conveyed from an upstream product filling assembly or machine (not shown) along a product conveyor 14. The products generally are introduced into the product grouping system in a substantially single line of products being moved along a path of travel 16 along input section 17 (FIG. 1) of the product conveyor 14. As the products are transitioned between the input section 17 of the product conveyor 14 and the second or grouping section 18 of the product conveyor, they are passed over a transfer plate 22 and are initially engaged by a series of metering lugs 29 of a pair of opposed metering units 26 and 27.

As indicated in FIGS. 1, 6A and 6B, the metering lugs are product pitched and generally are moving at substantially the same rate as the products are moving along the product conveyor. As the metering lugs are conveyed along their path of travel parallel to the line of products in the direction of arrow 43, they are also moved in a direction normal to the line of products, as indicated by arrows 44, so that the metering lugs are progressively moved into engagement with and subsequently urge the products laterally across the product conveyor into offset positions, offset from a centerline of the line of products being input to the product grouping system by an amount slightly greater than the width or thickness of each product. As indicated in FIG. 6A, as the metering lugs are moved in the direction of arrows 44 into engagement with the products, cam followers 46 attached to underside portions of each of the metering lugs 29 are moved along a lower or second cam track 42, which causes the metering lugs to be pivoted with respect to the product. The forward engaging portions 31 of the metering lugs accordingly are oriented and maintained substantially parallel to the sides of the products as they engage and urge the products across the product conveyor. As a result, the products are segregated or separated into multiple lanes 19 and 19' (FIGS. 1 and 6B–6C) of products, with each product typically separated by approximately one product length.

As the separated lanes of products are moved out of the metering station, they are transitioned into a selector station 60, wherein selected products of each of the lanes 19 and 19' of products 12 are engaged by the selector lugs 68 of a pair of opposed selector units 61 and 62 (FIG. 1). The pitch of the selector lugs of each unit generally is spaced dependent upon the rate at which the products are being fed into the product grouping system from the filling station or mechanism, the number of products to be grouped, and the rate at which the product packaging machine is packaging the groups of products. The selector lugs of each of the selector units 61 and 62 are moved into engagement with a selected one of a series of products moving along the multiple lanes of the product conveyor through the selector station, i.e., the selector lugs will engage every third, fourth, or fifth product, depending upon the size of the product groups, i.e., three, four, or five, to be formed.

The selector lugs of each of the selector units also generally are moved at different rates, each of which are slightly faster than the rate at which the products are being moved along the product conveyor so that each of the products in the selected group of products will catch up to their immediately preceding products to form a group of products that are aligned in a substantially end-to-end abutting relationship, as indicated in FIGS. 1 and 6D. In addition, the selector lugs of the selector unit 62 (FIG. 1) will be moved at a slightly greater rate than the selector lugs of selector unit 61 so that the group of products formed by selector unit 62 will also catch up to and be aligned with a corresponding group of products formed by selector unit 61. As a result, the groups of products are presented in a substantially parallel alignment at the discharge or transfer point 20 between the product conveyor 14 of the product grouping system 10 and in-feed conveyor 13 of the downstream packaging machine so that the groups are formed into a desired product package arrangement, i.e., a four-pack, six-pack, eight-pack, ten-pack, or other arrangement.

It will be understood by those skilled in the art that while the present invention has been disclosed with respect to preferred embodiments, various modifications, additions and changes can be made thereto without departing from the spirit and scope of the invention as set forth in the following claims.

What is claimed is:

1. A method of grouping products for packaging, comprising:
    moving a series of products along a path of travel toward a packaging machine;
    moving the products into positions offset from their path of travel by approximately half a width of the products to guide the products into separate product lanes;
    engaging and urging selected products in a first one of the product lanes into engagement with additional ones of the products at a first rate with respect to the products moving along the first product lane, and engaging and urging selected products in a second one of the product lanes into engagement with additional ones of the products at a second rate with respect to the products moving along the second product lane to form groups of products for packaging; and
    transferring the groups of products to the packaging machine.

2. The method of claim 1 and wherein moving the products into positions offset from their path of travel comprises moving a series of metering lugs about a conveying path substantially parallel to the path of the products and moving the metering lugs in a direction substantially normal to the path of the products to engage and urge the products into their offset positions.

3. The method of claim 2 and wherein shifting the metering lugs comprises moving a cam follower of each metering lug along a cam track for guiding movement of the metering lugs in a direction normal to the path of the products.

4. The method of claim 1 and wherein engaging and urging selected products in each lane of products comprises moving a series of spaced selector lugs along the path of travel of the products into engagement with the selected products.

5. The method of claim 4 and further comprising moving the selector lugs at a rate greater than a rate of movement of the products along their path of travel so as to cause the products of each selected group of products to be moved into edge-to-edge abutment.

6. The method of claim 4 and wherein moving the selector lugs at a rate greater than a rate of movement of the products comprises moving a first series of selector lugs at a first rate with respect to the products and moving a second series of selector lugs at a second rate with respect to the products.

7. The method of claim 1 and wherein engaging and urging selected ones of the products comprises engaging the selected products of each lane of products with a series of spaced selector lugs moving at different rates.

8. The method of claim 1 and wherein the second rate is faster than the first rate.

9. The method of claim 1 and further comprising aligning a series of metering lugs of a pair of metering units positioned on opposite sides of the path of travel of the products with alternating ones of the products, and engaging and urging the alternate ones of the products in opposite directions across the path of travel of the products.

10. A system for grouping aseptic products for packaging, comprising:

a product conveyor having multiple lanes along which the products are moved in series;

a metering station having a series of metering lugs that are moved into engagement with the products so as to urge the products into the multiple lanes of the product conveyor;

a selector station positioned downstream from the metering station and having a series of selector units, mounted along the lanes of the product conveyor, each selector unit including a lug conveyor having a series of selector lugs mounted therealong and adapted to engage selected ones of the products moving along the lanes of the product conveyor to form groups of products for packaging; and wherein the lug conveyor of one of the selector units is operated at a first rate and the lug conveyor of another selector unit is operated at a second rate, and wherein the first and second rates of the lug conveyors of the selector units are faster than a rate at which the products are moving along the product conveyor so as to urge the selected products into end-to-end abutment to form the product groups.

11. The system of claim 10 and wherein said metering station comprises a series of opposed metering units mounted on opposite sides of the product conveyor.

12. The system of claim 11 and wherein each metering unit comprise a lug conveyor along which the metering lugs are mounted in spaced series and a conveyor cam track in which a first cam follower attached to each metering lug is received and moved therealong for guiding the metering lugs toward and away from engagement with the products.

13. The system of claim 12 and further comprising a second cam track in which a second cam follower attached to each metering lug is received and is moved so as to cause each metering lug to move in a substantially parallel alignment with respect to the products as the metering lugs engage and urge the products into their product lanes.

14. The system of claim 10 and wherein the product conveyor comprises an input section along which the products are moved in-line with each other, and a grouping section along which the multiple lanes are defined.

15. The system of claim 14 and wherein the product conveyor comprises a raised rib conveyor, and further includes a transfer plate between the input and grouping sections of the product conveyor.

16. The system of claim 10 and wherein the metering lugs each include a proximal portion adapted to engage and bear against the products and a distal portion mounted to a lug conveyor.

17. The system of claim 10 and wherein the selector lugs are mounted along each lug conveyor at spaced intervals, and wherein the lug conveyor of each selector unit is moved at varying rates faster than the movement of the groups of products along the lanes of the product conveyor.

18. The system of claim 10 and wherein the product conveyor further comprises a divider plate between the lanes of the product conveyor.

19. The system of claim 10 and wherein each of said selector lugs is pivotable away from the products.

20. The system of claim 10 and wherein the selector units each comprise a guide positioned along the lanes of the product conveyor so as to be engaged by the selector lugs to maintain the selector lugs in an extended, engaging position.

21. A method of grouping aseptic brick products for packaging, comprising:

conveying a line of aseptic bricks along a product conveyor at a desired rate of movement;

engaging and urging the aseptic bricks into multiple lanes of the product conveyor;

engaging selected ones of the aseptic bricks moving along the multiple lanes of the product conveyor with a series of spaced selector lugs;

urging the selected aseptic bricks along their lanes of the product conveyor with their selector lugs moving at a faster rate than the rate of movement of the aseptic bricks along the product conveyor by moving a first series of selector lugs at a first rate with respect to the products and by moving a second series of selector lugs at a second rate with respect to the products; and moving a series of aseptic bricks into edge-to-edge abutment to form a desired product group for packaging.

22. The method of claim 21 and wherein engaging and urging the aseptic bricks into multiple lanes comprises moving alternating ones of the line of aseptic bricks in opposite directions across the product conveyor into positions offset from the line of aseptic bricks by approximately half width of the aseptic bricks.

23. The method of claim 22 and wherein moving the products into positions offset from their path of travel comprises moving a series of metering lugs about a conveying path substantially parallel to the path of the products and shifting the metering lugs in a direction substantially normal to the path of the products to engage and urge the products into their offset positions.

24. The method of claim 23 and wherein shifting the metering lugs comprises moving a cam follower of each metering lug along a cam track for guiding movement of the metering lugs in a direction normal to the path of the products.

25. The method of claim 21 and wherein engaging and urging selected ones of the products comprises engaging each line of products with a series of spaced selector lugs moving at different rates.

26. The method of claim 21 and further comprising guiding the selector lugs into a raised product engaging position.

27. The method of claim 21 and further comprising transferring the groups of aseptic bricks to a packaging machine.

* * * * *